Jan. 26, 1932.  T. G. NYBORG  1,843,042
CONVEYER
Filed Oct. 21, 1929    2 Sheets-Sheet 1
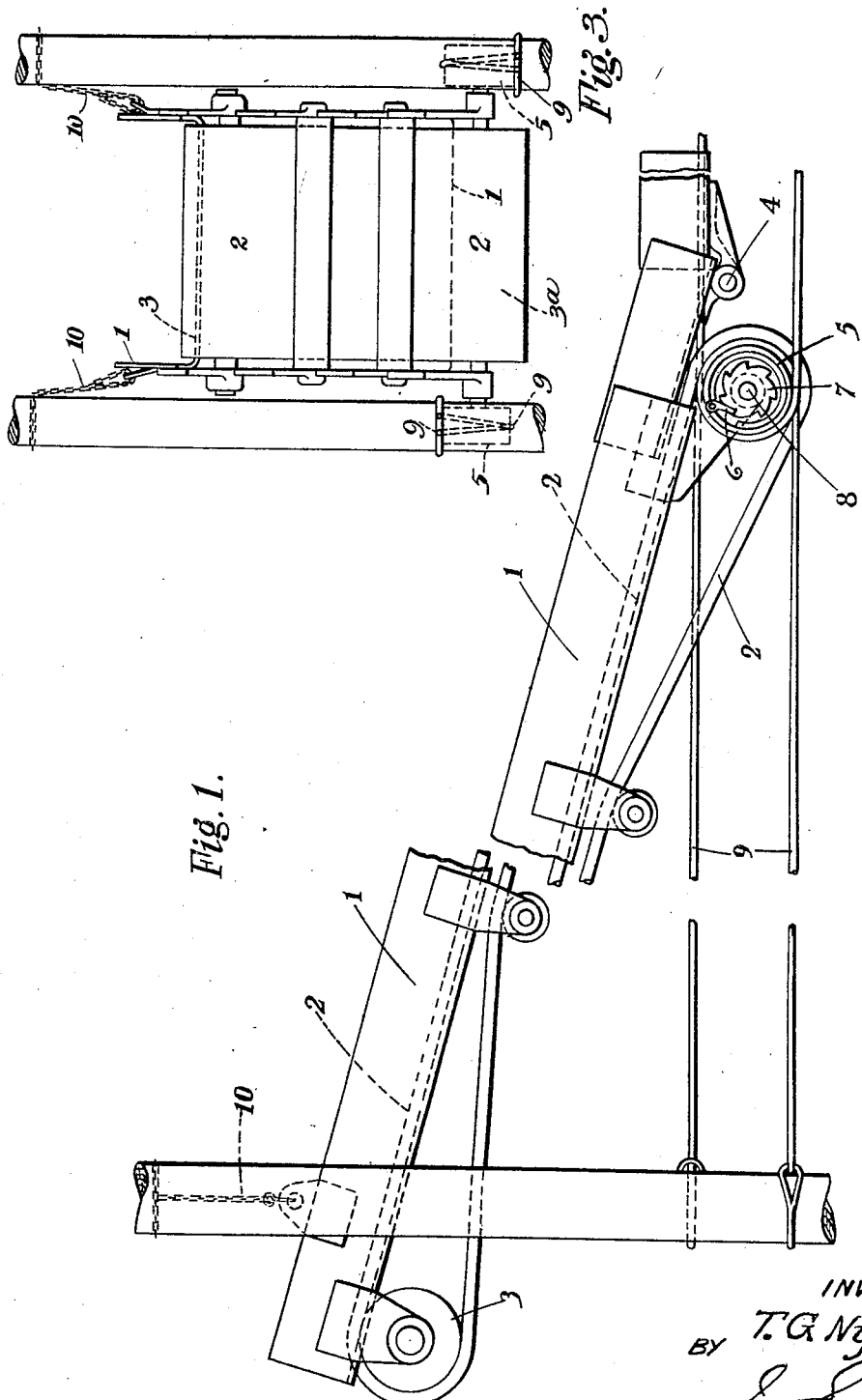
INVENTOR
T. G. Nyborg
BY
ATTORNEY

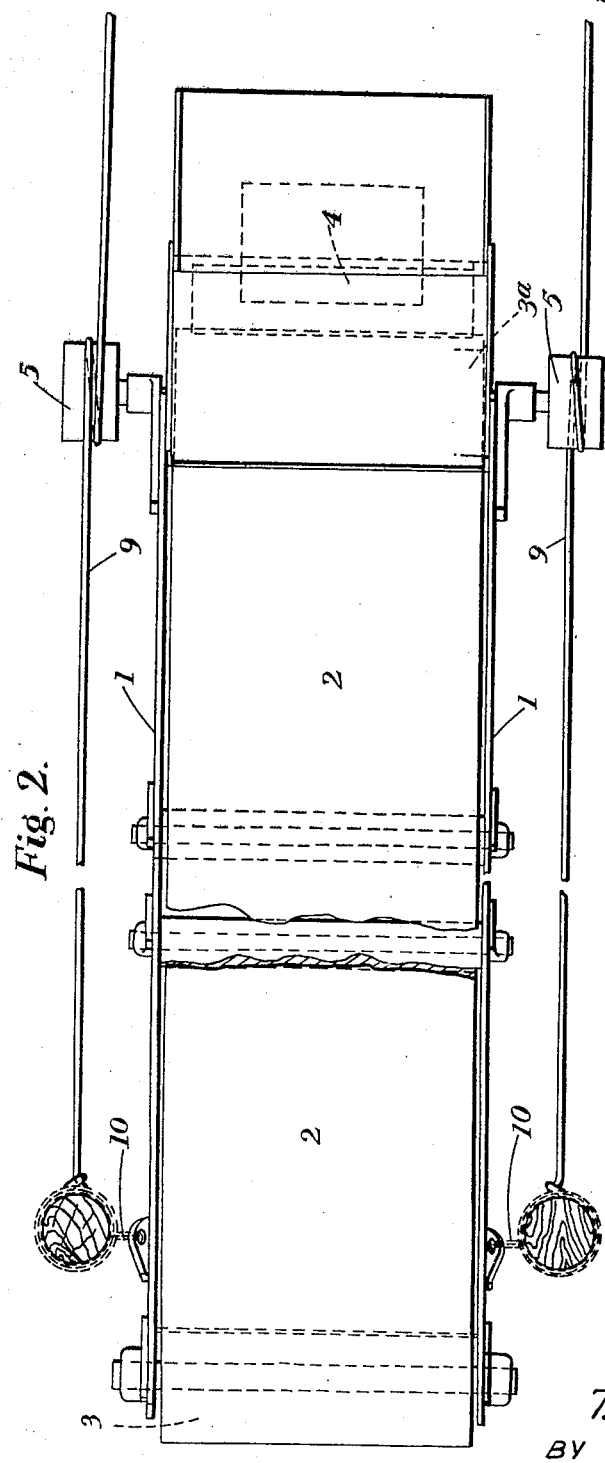

Patented Jan. 26, 1932

1,843,042

UNITED STATES PATENT OFFICE

TAGE GEORG NYBORG, OF WORCESTER, ENGLAND, ASSIGNOR OF ONE-HALF TO MARK FREDERICK HIGGINS, OF WORCESTER, ENGLAND

CONVEYER

Application filed October 21, 1929, Serial No. 401,203, and in Great Britain October 29, 1928.

This invention relates to conveyers of the shaker type. The main object of the invention is to provide, in connection with such conveyers, improved means whereby the material at the discharge end may be loaded into tubs, or trams, or raised above the level of the conveyer.

It is well known that the shaker type of conveyer does not as a rule operate satisfactorily against a gradient. According to the present invention a loader or elevator (hereinafter referred to simply as a loader) is driven direct from the shaker conveyer, the "shaker" motion being converted into uni-directional motion.

The invention further includes the improved features, combinations and arrangements embodied in the preferred form illustrated by the accompanying drawings, wherein:—

Figure 1 is a side elevation.
Figure 2 a plan, and
Figure 3 an end view.

As illustrated, the loader takes the form of a trough continuation 1 provided with a belt 2 of rubber, wire, mat or similar material, on to which the material is discharged by the shaker motion. The belt 2 may be of the endless type mounted on pulleys or drums 3, 3a carried beneath each end of the trough. The trough is pivotally connected at 4 so that it may be lowered or raised to the required extent. The driving of the belt is accomplished by reversed ratchet or equivalent mechanisms operating upon the driving pulley in such a way that the reciprocating motion of the shaker conveyer gives a motion to the belt in a forward direction, on both the forward and backward stroke. This may conveniently be carried out by providing a pair of drums 5 each carrying a pawl 6 for engaging corresponding ratchets 7 upon the axle 8 of the driving drum 3a. One drum 5 may be carried upon each side of the trough and a pair of fixed driving chains 9 or their equivalent, lying longitudinally one on each side of the trough, drive the drums owing to the bodily reciprocating motion of the latter. Both ends of these chains 9 may be simply fixed to some stationary object.

The chains 9 may pass round the drums 5 in opposite directions so that the latter revolve accordingly at each stroke; thus while one pawl is driving its ratchet, the other is returning to engage the next tooth and vice versa. The discharge end may conveniently be suspended to swing upon chains 10 as indicated.

The ratchet and pawl mechanisms are duplicated on the respective sides and the cable 9 on one side passes around one pulley 5, in say a clockwise direction, and around the other pulley 5 in an anti-clockwise direction. Thus, as illustrated, on movement of the shaker toward the left in Figure 2, the ratchet mechanism of the pulley 5 at the bottom of the figure is given a driving movement, while the pulley 5 at the top of Figure 2 is having an idle movement. On the movement of the shaker toward the right, the upper pulley 5 becomes the operative element and the lower pulley 5 the idle element.

I claim:—

1. The combination of a shaker conveyer, including a frame supported for shaker movement, a load-carrying element movable longitudinally of the shaker conveyer, and relatively reversed ratchet devices, controlling the movement of the load-carrying element and operated in both relatively opposite shaker movements to compel a uni-directional independent motion of the load-carrying element.

2. The combination of a shaker conveyer including a delivery section, a load-carrying belt forming a part of the shaker conveyer delivery path and having its adjacent ends directly connected and moving with the delivery section, means for driving the load-carrying belt, and means operated in the respective shaking motions of the conveyer to actuate the belt driving means to impart a uni-directional movement to the belt independently of the direction of movement of the delivery section of the shaker conveyer.

3. The combination of a shaker conveyer including a movably connected delivery section, a load-carrying belt cooperating with the delivery section, driving means for the belt, operating means for the belt, relatively fixed elements cooperating with the driving means, and mechanism utilizing the relatively fixed driving means to actuate the belt operating means in all shaker movements of the delivery section to impart a uni-directional movement to the belt in all such shaker movements.

4. A loader forming part of a shaker conveyer and including an endless belt, a driving pulley for the belt, fixed operating members, and connections intermediate the fixed operating members and driving pulley whereby in all shaker movements of the loader a uni-directional movement is imparted to the pulley to thereby independently operate the belt continuously in one direction.

5. A shaker conveyer including a loader section, an endless belt forming part of said loader section, a pulley for driving the belt, oscillating members arranged beyond the pulley, fixed members engaging said oscillating members and operating the same in relatively reverse directions in the shaker movements of the loader, and pawl and ratchet mechanism intermediate the oscillating members and pulley to convert the relatively opposite movement of the oscillating members into a uni-directional driving force on the pulley and thereby the belt.

6. A shaker conveyer including a loader section, an endless belt forming part of said section, a pulley for operating the belt, fixed operating members, pulley actuating elements arranged at the respective ends of the pulley and operated in relatively reverse directions by the fixed operating members in the shaker movement of the loader, and pawl and ratchet mechanism intermediate each of said elements and the pulley to utilize a particular directional movement of each of said elements as a driving means for the belt pulley and therefore for the belt, the said operative movement of the elements compelling a uni-directional movement of the pulley and thereby the belt.

In testimony whereof I affix my signature.

TAGE GEORG NYBORG.